United States Patent [19]

Adams

[11] 4,169,578
[45] Oct. 2, 1979

[54] ROTARY VALVE WITH SPRING BIASED VALVE MEMBER

[75] Inventor: Ladd M. Adams, Norman, Okla.
[73] Assignee: Entek Corporation, Norman, Okla.
[21] Appl. No.: 856,345
[22] Filed: Dec. 1, 1977

Related U.S. Application Data

[63] Continuation-in-part of Ser. No. 606,865, Aug. 22, 1975, Pat. No. 4,072,291.
[51] Int. Cl.$^2$ .................... F16K 5/06; F16K 15/04; F16L 29/00
[52] U.S. Cl. .................... 251/149.9; 251/181; 251/309; 137/539; 137/269.5
[58] Field of Search ............ 137/269.5, 614.18, 539, 137/798, DIG. 2, DIG. 4, 614.06; 251/309, 312, 315, 297, 181, 149.9, 148; 285/DIG. 25

[56] References Cited

U.S. PATENT DOCUMENTS

| 500,944 | 7/1893 | Pickel | 137/269.5 X |
|---|---|---|---|
| 1,185,333 | 5/1916 | Keltner | 137/269.5 X |
| 1,992,319 | 2/1935 | Maggenti | 137/614.18 X |
| 3,406,943 | 10/1968 | Newell | 251/309 X |
| 3,512,944 | 5/1970 | Graig et al. | 251/309 |
| 3,698,685 | 10/1972 | Lang | 137/DIG. 4 |
| 3,771,762 | 11/1973 | Mayernik et al. | 251/148 |
| 3,802,457 | 4/1974 | Wurzburger | 251/309 X |
| 4,029,125 | 6/1977 | Steydle et al. | 251/149.9 |
| 4,069,842 | 1/1978 | Steydle et al. | 137/614.06 X |

Primary Examiner—William R. Cline
Attorney, Agent, or Firm—Laney, Dougherty, Hessin & Beavers

[57] ABSTRACT

An improved rotary valve comprising a valve body having a flow passage extending therethrough and a rotary valve stem journaled in said valve body transversely intersecting the flow passage. The valve stem includes at least one spring biased spherical valve member carried in a radially aligned cavity formed in the valve stem. A valve seat is formed in the valve body coaxial with the flow passage and is conformed to sealingly receive the spring biased valve member therein when the valve is placed in the closed position. The valve stem is pressure equalized within the valve body. In one form the valve stem is provided with an external configuration adjacent the valve member and flow passage to maintain a constant flow rate through the open valve. In another form this external configuration is modified to provide for varying the flow rate through the open valve through manipulation of the valve stem. A pressure equalized probe mechanism is disclosed as well as methods of forming valve seats within the valve bodies to conform to the configuration of the associated valve members.

11 Claims, 17 Drawing Figures

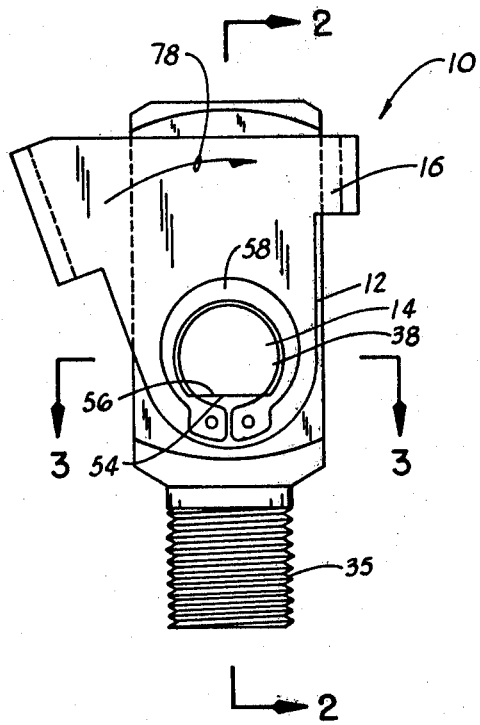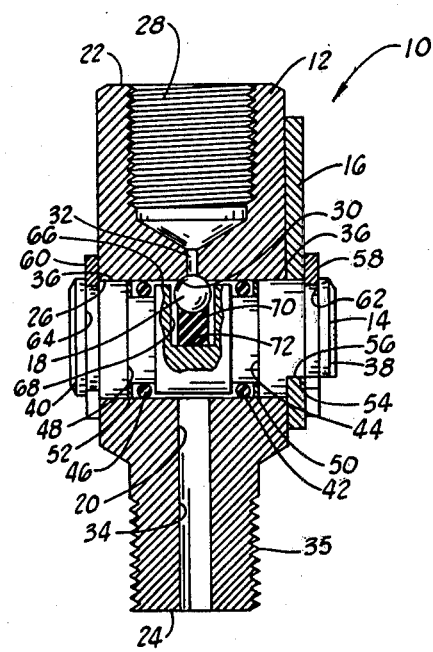

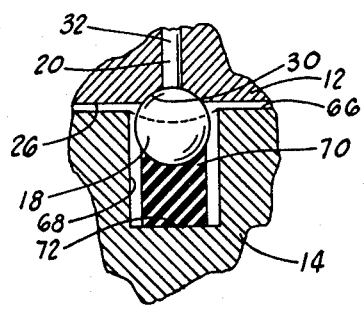
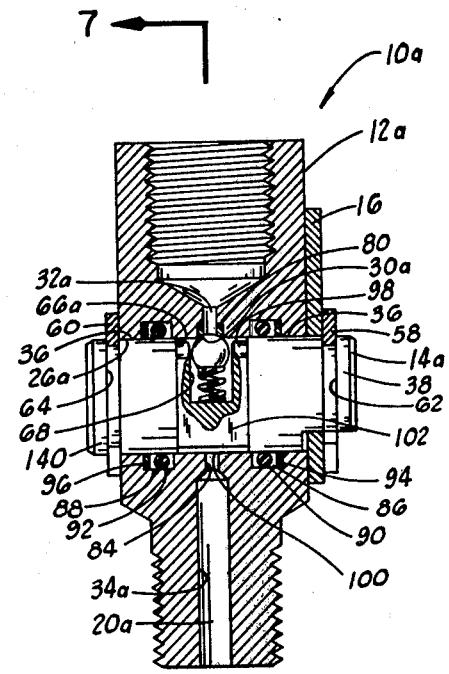
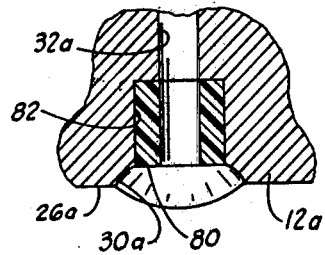
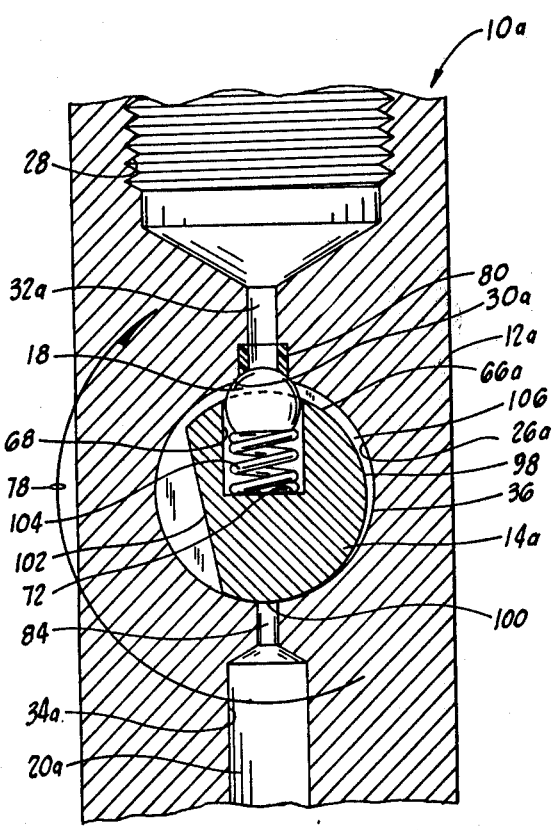

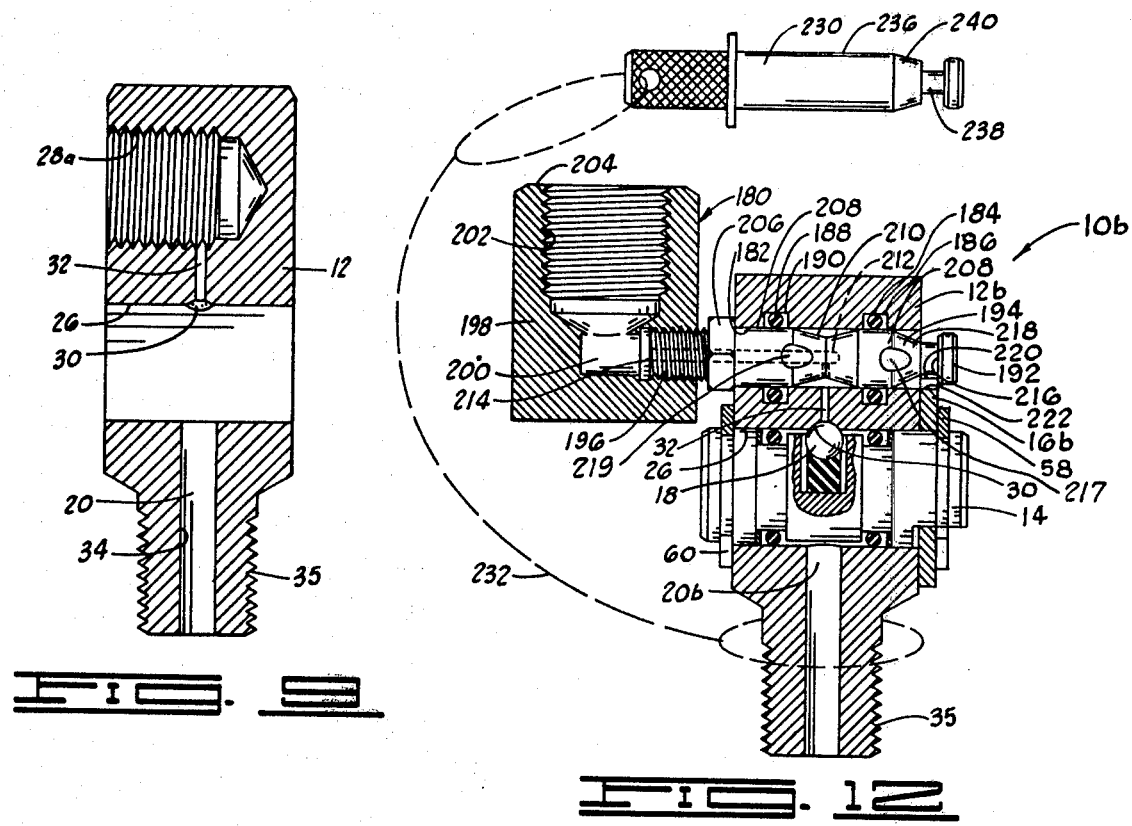
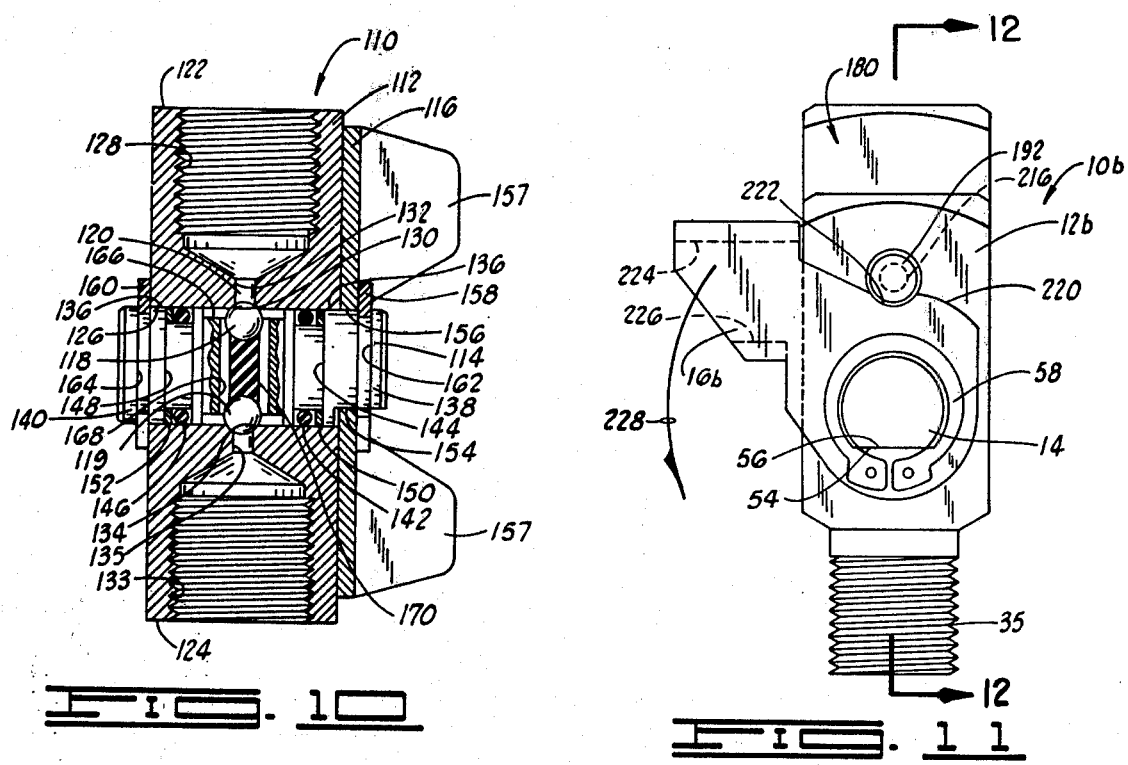

ROTARY VALVE WITH SPRING BIASED VALVE MEMBER

RELATED APPLICATIONS

This application is a continuation-in-part of Ser. No. 606,865 entitled "Rotary Valve With Spring Biased Valve Member," filed Aug. 22, 1975, now U.S. Pat. No. 4,072,291, and which is assigned to the assignee of the present application.

BACKGROUND OF THE INVENTION

1. Field of the Invention

This invention relates generally to improvements in valves, and more particularly, but not by way of limitation, to rotary valves with spring biased valve members.

2. Description of the Prior Art

It is well known in the prior art to employ screw type needle valves between a source of high pressure fluid and a pressure gauge in order to permit periodic pressure readings at the pressure gauge without subjecting the pressure gauge to constant application of the high pressure fluid. Such valves provide limited utility since their sealing capability degenerates rapidly when the valve is cycled between the open and closed positions.

Many of the prior art valves employed in high pressure application are constructed with bonnets threadedly secured to the valve bodies to provide a fluid-tight seal about the valve stem which is constantly loaded under pressure and maintained within the valve body by the bonnet. Such valve structures are often hazardous in high pressure corrosive emvironments due to the fact that often the manipulation of the valve stem in an effort to open the valve causes the bonnet, which has become corroded to the valve stem, to be disengaged from the valve body. Such loosening of the bonnet from the valve body presents an extreme hazard in high pressure and corrosive environments where the valve member, valve stem and bonnet may be blown out of the valve body in response to the high pressure applied to the valve.

The usual configuration of the prior art needle valve structures places the needle valve member downstream from the corresponding valve seat so that the pressure differential across the engaged valve member and valve seat tends to unseat the valve member from the valve seat thus promoting leakage past the valve. Once such leakage starts, it often results in the destruction of the valve seat and the ultimate destruction of the valve thereby requiring the replacement with the attendant inconvenience and expense. The use of relatively soft valve seats in prior art gauge valves and the like to increase the sealing engagement between the valve member and valve seat is accompanied by a reduction in the maximum fluid pressure the valves can handle.

SUMMARY OF THE INVENTION

The present invention contemplates a valve comprising a valve body having a flow passage formed therein and a bore extending at least partially through the valve body and transversely intersecting the flow passage. A valve stem is journaled in the bore and a seal mutually engages the valve stem and the bore to provide fluid-tight communication between the bore and the flow passage at the intersection therebetween. A valve seat is disposed in the valve body along at least one line of intersection between the flow passage and the bore. The valve stem carries a valve member which is adapted for radial motion relative to the valve stem for engaging the valve seat to close the flow passage, and alternately, disengaging from the valve seat to open the flow passage. The valve stem is provided with biasing means operatively engaging the valve stem and the valve member for urging the valve member radially outwardly relative to the valve stem. The valve further includes operating means engageable with the valve stem for moving the valve stem and the valve member relative to the valve seat means and the valve body into a position closing the flow passage and, alternately, into a position opening the flow passage.

An object of the invention is to provide a rotary valve of increased efficiency.

Another object of the invention is to provide a rotary valve which may be advantageously employed in high pressure and corrosive environments.

A further object of the invention is to provide a rotary valve which may be repeatedly cycled between open and closed positions without adversely affecting the sealing capabilities thereof.

A still further object of the invention is to provide a rotary valve having a spring biased valve member which is economical in construction and operation.

Other objects and advantages of the invention will be evident from the following detailed description when read in conjunction with the accompanying drawings.

BRIEF DESCRIPTION OF THE DRAWINGS

FIG. 1 is an elevational view of a rotary gauge valve constructed in accordance with the present invention.

FIG. 2 is a vertical cross-sectional view taken along lines 3—3 of FIG. 1.

FIG. 3 is a horizontal cross-sectional view taken along lines 3—3 of FIG. 1.

FIG. 4 is a top plan view of the rotary gauge valve of FIG. 1.

FIG. 5 is an enlarged fragmentary cross-sectional view illustrating the details of construction of the valve stem, valve member biasing means and valve seat of the rotary gauge valve of FIG. 1.

FIG. 6 is a vertical cross-sectional view similar to FIG. 2 and illustrating an alternate form of rotary gauge valve constructed in accordance with the present invention.

FIG. 7 is an enlarged cross-sectional view taken along lines 7—7 of FIG. 6.

FIG. 8 is an enlarged fragmentary cross-sectional view illustrating the details of construction of the valve seat of the rotary gauge valve of FIG. 6.

FIG. 9 is a vertical cross-sectional view similar to FIG. 2 and illustrating an alternate form of valve body constructed in accordance with the present invention.

FIG. 10 is a vertical cross-sectional view similar to FIG. 2 and illustrating another form of valve constructed in accordance with the present invention and having bi-directional valve closing seats and valve members.

FIG. 11 is an elevational view of another form of valve constructed in accordance with the present invention including a pressure probe and means for sealingly receiving the pressure probe within the valve body.

FIG. 12 is a cross-sectional view taken along line 12—12 of FIG. 11.

DESCRIPTION OF THE PREFERRED EMBODIMENT

Figure 13:
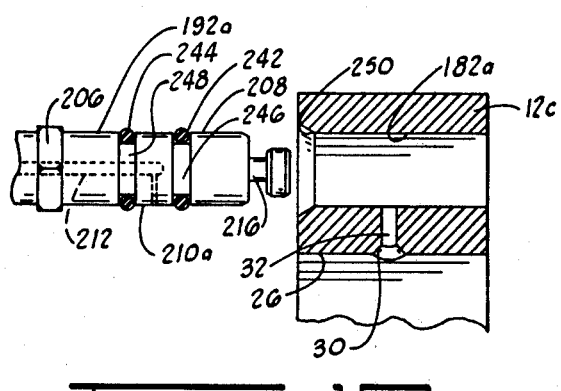
FIG. 13 is a partial cross-sectional view similar to FIG. 12 and illustrating an alternate form of probe and seal configuration for use with the valve structure of FIG. 11.

Referring now to the drawings and to FIGS. 1, 2, 3, 4 and 5 in particular, a rotary gauge valve constructed in accordance with the present invention will be generally designated by the reference character 10. The valve 10 comprises a valve body 12, a valve stem 14, an operating handle 16 and a valve member 18.

The valve body 12 may be suitably formed of a length of stainless steel or mild steel bar stock and includes a flow passage 20 extending longitudinally therethrough and communicating between the upper end face 22 and lower end face 24 of the valve body. A transverse bore 26 extends through the valve body 12 intersecting the flow passage 20 intermediate the upper and lower end faces 22 and 24. The upper end portion of the flow passage 20 includes an internally threaded portion 28 which communicates with the upper end face 22 and provides means for threadedly securing an externally threaded member to the valve body 12 to provide fluid communication between the valve body and a suitable instrument such as a pressure gage. The portion of the flow passage 20 which communicates between the transverse bore 26 and the internally threaded portion 28 includes a downwardly facing, substantially spherically shaped concave annular valve seat 30 and a passage segment 32 communicating with the valve seat. The diameter of the passage segment 32 is substantially less than the diameter of the transverse bore 26 intersecting the flow passage 20. The flow passage 20 further includes a lower passage segment 34 which intersects the transverse bore 26 and communicates between the transverse bore and the lower end face 24 of the valve body. An externally threaded portion 35 is preferably formed on the valve body 12 communicating with the lower end face 24 providing for threadedly securing an internally threaded member to the valve body 12 to provide fluid communication between the valve body and a source of pressurized fluid.

The valve stem 14 may be suitably formed of stainless steel, mild steel, brass, bronze or the like and includes a substantially cylindrical outer surface 36 having a diameter slightly less than the diameter of the transverse bore 26 to provide a close fit therebetween. The valve stem 14 is journaled in the transverse bore 26 of the valve body 12 with the first and second end portions 38 and 40 thereof extending beyond their respective sides of the valve body 12.

A first resilient annular seal 42, such as an elastomeric or synthetic resinous O-ring, is disposed within a first annular groove 44 formed in the cylindrical outer surface 36 of the valve stem 14 and provides sealing engagement between the valve stem and the transverse bore 26 on one side of the intersection of the bore 26 and the flow passage 20. A second resilient annular seal 46, such as an elastomeric or synthetic resinous O-ring, is disposed in a second annular groove 48 formed in the cylindrical outer surface 36 of the valve stem 14 and provides sealing engagement between the valve stem and the transverse bore 26 on the opposite side of the intersection of the transverse bore 26 and the flow passage 20. First and second relatively rigid annular back-up rings 50 and 52 are disposed respectively within the annular grooves 44 and 48. The back-up rings 50 and 52 are preferably in the form of Teflon washers and provide means for preventing the extrusion of the annular seal members 42 and 46 between the valve stem 14 and the transverse bore 26 under the application of high pressure thereto.

A flat surface 54 is formed on the first end portion 38 of the valve stem 14. The operating handle 16 includes an aperture 56 formed therethrough which is sized and shaped to conform to the configuration of the cylindrical outer surface 36 as interrupted by the flat surface 54 on the valve stem 14. The operating handle 16 is secured to the valve stem 14 in non-rotating relation with the first end portion 38 of the valve stem extending through the aperture 56 of the operating handle.

The valve stem 14 is longitudinally secured within the bore 26 in the valve body 12 and the operating handle 16 is secured on the valve stem 14 by means of a pair of snap rings 58 and 60 disposed respectively in annular grooves 62 and 64 formed in the first and second end portions 38 and 40 of the valve stem 14.

The valve stem 14 further includes an intermediate peripheral surface 66 formed thereon intermediate the first and second annular grooves 44 and 48. The intermediate peripheral surface 66 is preferably substantially cylindrical and the diameter thereof is preferably somewhat less than the diameter of the cylindrical outer surface 36 to provide a flow area between the valve stem 14 and the transverse bore 26. The diameter of the intermediate peripheral surface 66 may be selected to provide a cross-sectional flow area between the valve stem 14 and the wall of the transverse bore 26 of a suitable magnitude to provide protection against surges in flow when the valve is opened or to provide a fixed flow rate.

A radially aligned blind hole or cavity 68 is formed in the intermediate peripheral surface 66 of the valve stem 14 and the valve member 18 is radially, slidably disposed therein. The valve member 18 is provided with a substantially spherically shaped convex surface thereon which conforms to the size and shape of the concave valve seat 30 of the valve body 12. A biasing member 70 is disposed within the cavity 68 intermediate the valve member 18 and the bottom 72 of the cavity. The valve member 18 is preferably a hardened steel ball such as a conventional bearing ball and the biasing member 70 may be suitably formed of a substantially solid block of resilient material such as an elastomeric material or a synthetic resinous material. The biasing member 70 constantly urges the valve member 18 radially outwardly relative to the valve stem 14 so that the valve member 18 is firmly urged into sealing engagement with the valve seat 30 when they are properly aligned by the cavity 68 of the valve stem 14 through the manipulation of the operating handle 16.

The operating handle 16 includes a pair of inwardly directed tabs 74 and 76 which limit the amount of permissible rotation of the operating handle and valve stem 14 relative to the valve body 12 through alternate engagement of the tabs with the valve body. As shown in FIGS. 1 and 4, the operating handle 16 and valve stem 14 are in a closed position maintaining the valve member 18 in alignment and sealing engagement with the valve seat 30, thereby preventing any upward flow through the flow passage 20 of the valve body. By rotating the operating handle 16 and valve stem 14 in the direction indicated by the arrow 78 in FIG. 1, the valve member 18 is rotated out of sealing engagement with the valve seat 30 thus providing fluid communication through the valve body 12 via the flow passage 20 and the transverse bore 26. When the operating handle 16 and valve stem 14 are rotated back to the closed position, the valve member 18 and valve seat 30 are then placed in registration to again relieve sealing engagement therewith in response to the urging of the biasing member 70.

It will be seen that due to the inherent check valve structure of the gage valve 10, if the pressure seen at the lower passage segment 34 drops below the pressure seen at the passage segment 32 a sufficient amount to overcome the spring bias of the biasing member 70, the pressure at the passage segment 32 will bleed downwardly past the valve member 18 until a pressure equilibrium is achieved. Also, as long as the pressure seen at the lower passage segment 34 and the bore 26 is greater than the pressure seen at the passage segment 32, this pressure differential will augment the spring force maintaining sealing engagement between the valve member 18 and the valve seat 30.

It will also be noted that the positioning of the first and second annular seal members 42 and 46 on either side of the intersection between the flow passage 20 and the transverse bore 26 provides a pressure-balanced valve stem which is most advantageous from a safety standpoint in high pressure applications.

It will be understood that while the valve member 18 is preferably constructed in the form of a hardened steel ball, the valve member may suitably be constructed in other forms as long as a portion of the valve member is provided with a substantially spherically shaped convex surface sized and shaped to conform the concave surface of the corresponding valve seat 30. It will also be understood that a compression coil spring may be employed as the biasing member interposed between the valve member 18 and the bottom 72 of the cavity 68 in the valve stem 14.

DESCRIPTION OF THE EMBODIMENT OF FIGS. 6, 7 AND 8

A slightly modified form of the rotary gage valve of the present invention is illustrated in FIGS. 6, 7 and 8 and is generally designated by the reference character 10a. The gage valve 10a includes a slightly modified valve body 12a and a slightly modified valve stem 14a. Those elements common to the valve 10a will be designated by their former reference characters.

The valve body 12a includes a modified valve seat 30a which includes a resilient annular seal member 80 disposed within an annular recess 82 formed in and concentric with the passage segment 32a and communicating with the substantially spherically shaped convex portion of the valve seat 30a. The annular seal member 80 may be suitably formed of an elastomeric or synthetic resinous material.

The lower passage segment 34a of the modified flow passage 20a extending through the valve body 12a includes an orifice 84 formed therein communicating with the modified transverse bore 26a. The cross-sectional area of the orifice 84 is preferably less than the cross-sectional area of the passage segment 32a.

The transverse bore 26a includes first and second annular grooves 86 and 88 formed respectively therein on one side and the opposite side of the intersection between the flow passage 20a and the transverse bore 26a. First and second annular resilient seal members 90 and 92 are disposed respectively in the first and second annular grooves 86 and 88. The seal members 90 and 92 may suitably be elastomeric or synthetic resinous O-rings. First and second relatively rigid back-up rings 94 and 96, suitably formed of Teflon, are also disposed respectively in the first and second annular grooves 86 and 88.

The modified valve stem 14a is characterized by the elimination of any annular seal grooves therein. The cylindrical outer surface 36 of the modified valve stem 14a is sealingly engaged by the first and second resilient seal members 90 and 92. The valve stem 14a is journaled within the transverse bore 26a and is maintained therein by snap rings 58 and 60 disposed in annular grooves 62 and 64. The operating handle 16 is also secured in place in non-rotating relation on the valve stem 14a by the snap ring 58 in the same manner as described for the rotary gage valve 10.

The valve stem 14a further includes a modified intermediate peripheral surface 66a formed thereon intermediate the areas of sealing engagement between the first and second annular seal members 90 and 92 and the cylindrical outer surface 36 of the valve stem 14a. A radially aligned, blind hole or cavity 68 is formed in the intermediate peripheral surface 66a with the axis thereof being coplanar with the axis of the flow passage 20a of the valve body 12a. A portion of the intermediate peripheral surface 66a comprises a substantially cylindrical outer surface 98 the diameter of which is slightly less than the diameter of the cylindrical outer surface 36 of the valve stem 14a. The longitudinal axis of the cylindrical outer surface 98 is parallel to the longitudinal axis of the cylindrical outer surface 36 and is spaced a distance downwardly therefrom as viewed in FIG. 7, equal to one-half the difference between their outer diameters. This eccentric relationship between the cylindrical outer surface 98 and the cylindrical outer surface 36 places these surfaces in coincidence along a line parallel to the longitudinal axis of the valve stem 14a as indicated at 100 in FIG. 7. The cylindrical outer surface 98 is preferably interrupted by a planar surface 102 extending the full length of the intermediate peripheral surface 66a.

As in the rotary gage valve 10, a spherical valve member 18 is disposed within the cavity 68 and is constantly urged radially outwardly therefrom by means of a biasing member 104 in the form of a compression coil spring interposed between the valve member 18 and the bottom 72 of the cavity 68. It will be readily apparent that the compression coil spring may be interchanged with the substantially solid block of resilient material employed in the rotary gage valve 10 and designated therein by the reference character 70.

The valve 10a is characterized by its capability for varying or throttling the rate of flow of fluid through the valve after it is actuated from the closed position to the open position. As viewed in FIG. 7, the valve 10a is in the closed position with the valve member 18 in sealing enngagement with the valve 30a and the resilient annular seal member 80. By rotating the valve stem 14a in the direction indicated by the arrow 78 through the actuation of the operating handle 16, as previously described for the rotary gage valve 10, the spherical valve member 18 will be unseated from the valve seat and resilient annular seal member and rotated to the right within the transverse bore 26a as viewed in FIG. 7. Simultaneously, that portion of the cylindrical outer surface 98 of the intermediate peripheral surface 66a which lies along the line 100 is rotated in a clockwise direction from a position substantially sealing the intersection between the orifice 84 and the transverse bore 26a. Continued clockwise rotation of the valve stem 14a as viewed in FIG. 7 increases the cross-sectional area of the fluid communication between the orifice 84 and the passage segments 32a between the eccentrically located cylindrical outer surface 98 and the inner wall of the transverse bore 26a as shown at 106. The diameter of the orifice 84 is preferably selected to provide a cross-sectional area at the orifice 84 which is less than the cross-sectional area of the passage segment 32a to thereby protect the sealing surface of the valve seat 30a and the resilient annular seal member 80. The diameter of the cylindrical outer surface 98 is also preferably selected such that the maximum cross-sectional flow area 106 between the throttling valve stem 14a and the transverse bore 26a is less than the cross-sectional area of the passage segment 32 to further provide protection for the sealing surfaces of the valve seat 30a and the resilient annular seal member 80.

FIG. 9 illustrates a slightly modified form of valve body 12 of the gage valve 10 in which the modified internally threaded portion 28a of the flow passage 20 is formed in the valve body along an axis intersecting the passage segment 32 of the flow passage 20 at a right angle. The remaining portion of the structure of the valve body retains the same reference characters previously assigned for the gage valve 10.

DESCRIPTION OF THE EMBODIMENT OF FIG. 10

FIG. 10 illustrates another form of rotary valve constructed in accordance with the present invention which is designated by the reference character 110. The valve 110 comprises a valve body 112, a valve stem 114, an operating handle 116 and a pair of valve members 118 and 119.

The valve body 112 may be suitably formed of a length of stainless steel or mild steel bar stock and includes a flow passage 120 extending longitudinally therethrough communicating between the upper end face 122 and the lower end face 124 of the valve body. A transverse bore 126 extends through the valve body 112 intersecting the flow passage 120 intermediate the valve body 112 intersecting the flow passage 120 intermediate the upper and lower end faces 122 and 124.

The upper end portion of the flow passage 120 includes an internally threaded portion 128 which communicates with the upper end face 122 and provides a means for threadedly securing an externally threaded member to the valve body 112 to provide fluid communication to the valve body. The portion of the flow passage 120 which communicates between the transverse bore 126 and the internally threaded portion 128 includes a downwardly facing, substantially spherically shaped concave annular valve seat 130 and a passage segment 132. The diameter of the passage segment 132 is substantially less than the diameter of the transverse bore 126 intersecting the flow passage 120.

The lower end portion of the flow passage 120 includes an internally threaded portion 133 which communicates with the lower end face 124 and provides means for threadedly securing an externally threaded member to the valve body 12 to provide fluid communication therewith. The portion of the flow passage 120 which communicates between the transverse bore 126 and the internally threaded portion 133 includes an upwardly facing, substantially spherically shaped concave annular valve seat 134 and a passage segment 135. The diameter of the passage segment 135 is substantially less than the diameter of the transverse bore 126 intersecting the flow passage 120.

The valve stem 114 may be suitably formed of stainless steel, mild steel, brass, bronze or the like, and includes a substantially cylindrical outer surface 136 having a diameter slightly less than the diameter of the transverse bore 126 to provide a close fit therebetween. The valve stem 114 is journaled in the transverse bore 126 of the valve body 112 with the first and second end portions 138 and 140 thereof extending beyond their respective sides of the valve body 112.

A first resilient annular seal 142, such as an elastomeric or synthetic resinous O-ring, is disposed within a first annular groove 144 formed in the cylindrical outer surface 136 of the valve stem 114 and provides sealing engagement between the valve stem and the transverse bore 126 on one side of the intersection of the bore 126 and the flow passage 120. A second resilient annular seal 146, substantially identical to the annular seal 142, is disposed in a second annular groove 148 formed in the cylindrical outer surface 136 of the valve stem 114 and provides sealing engagement between the valve stem and the transverse bore 126 on the opposite side of the intersection of the transverse bore 126 and the flow passage 120. First and second relatively rigid annular back-up rings 150 and 152 are disposed respectively within the annular grooves 144 and 148. The back-up rings 150 and 152 are preferably in the form of Teflon washers and provide means for preventing the extrusion of the annular seal members 142 and 146 between the valve stem 114 and the transverse bore 126 under the application of high pressure through the flow passage 120 into the transverse borehole 126 between the seal members 142 and 146.

A flat surface 154 is formed on the first end portion 138 of the valve stem 114. The operating handle 116 includes an aperture 156 formed therethrough which is sized and shaped to conform to the configuration of the cylindrical outer surface 136 as interrupted by the flat surface 154 on the valve stem 114. The operating handle 116 is secured to the valve stem 114 in non-rotating relation with the first end portion 138 of the valve stem 114 extending through the aperture 156 of the operating handle. The operating handle 116 preferably includes a pair of outwardly extending tabs or wings 157 which facilitate the grasping of the operating handle to rotate the operating handle and the valve stem 114 relative to the valve body 112.

The valve stem 114 is longitudinally secured within the bore 126 in the valve body 112, and the operating handle 116 is secured on the valve stem 114 as described above by means of a pair of snap rings 158 and 160 disposed respectively in annular grooves 162 and 164 formed in the cylindrical outer surface 136 at the first and second end portions 138 and 140 of the valve stem 114.

The valve stem 114 further includes an intermediate peripheral surface 166 formed thereon intermediate the first and second annular grooves 144 and 148. The intermediate peripheral surface 166 is preferably substantially cylindrical and the diameter thereof is preferably somewhat less than the diameter of the cylindrical outer surface 136. The diameter of the intermediate peripheral surface 166 may be selected to provide a cross-sectional flow area between the valve stem 114 and the wall of the transverse bore 126 of a suitable magnitude to provide protection against surges in flow when the valve is opened or to provide a fixed flow rate through the valve. The longitudinal axis of the cylindrically shaped intermediate peripheral surface 166 may be coaxial with the longitudinal axis of the cylindrical outer surface 136, or may be radially offset a distance from the longitudinal axis of the cylindrical outer surface 136 to provide throttling capability in the valve 110 similar to that described above for the valve 10a.

A radially aligned hole or cavity 168 extends through the longitudinal axis of the valve stem 114 and communicates with the intermediate peripheral surface 166 on opposite sides of the valve stem 114. The valve members 118 and 119 are radially, slidably disposed within the cavity 168. The valve members 118 and 119 are each provided with a substantially spherically shaped convex surface thereon which surfaces conform to the size and shape or the concave valve seats 130 and 134, respectively, of the valve body 112. A biasing member 170 is disposed within the cavity 166 intermediate the valve members 118 and 119. The valve members 118 and 119 are preferably hard steel balls and the biasing member 170 may be suitably formed of a substantially solid block of the resilient material such as an elastomeric or a synthetic resinous material. As an alternative, the biasing member 170 may be in the form of a compression coil spring. The biasing member 170 constantly urges the valve members 118 and 119 apart and radially outwardly relative to the valve stem 114 so that the valve member 118 is firmly urged into sealing engagement with the valve seat 130 and the valve member 119 is firmly urged into sealing engagement with the valve seat 134 when the valve members are properly aligned by the cavity 168 of the valve stem 114 through the manipulation of the operating handle 116.

If desired, the operating handle 116 may include one or more inwardly directed tabs which limit the amount of rotation of the operating handle and the valve stem 114 relative to the valve body 112 through engagement with the valve body in a manner as shown in FIG. 4. As shown in FIG. 10, the operating handle 116 and the valve stem 114 are in a position maintaining the valve members 118 and 119 in alignment and sealing engagement with the valve seats 130 and 134, thereby preventing any upward or downward flow through the flow passage 120 of the valve body 112. By rotating the operating handle 116 and valve stem 114 in either direction, the valve members 118 and 119 are rotated out of sealing engagement with the valve seats 130 and 134 thus providing fluid communication through the valve body 112 via the flow passage 120 and the transverse bore 126. When the operating handle 116 and the valve stem 114 are rotated back to the closed position, the valve members 118 and 119 are placed in registration with the valve seats 130 and 134 to again achieve sealing engagement therewith in response to the urging of the biasing member 170.

It will be seen that when the pressure seen within the transverse bore 126 between the annular seal members 142 and 146 is greater than the pressure seen at the passage segment 132 or the passage segment 134, the pressure differential across the respective valve member 118 or 119 will augment the spring force of the biasing member 170 maintaining engagement engagment between the valve member 118 and the valve seat 130 or the valve member 119 and the valve seat 134. It will also be noted that the positioning of the first and second annular seal members 142 and 146 on either side of the intersection between the flow passage 120 and the transverse bore 126 provides a pressure-balanced valve stem which is most advantageous from a safety standpoint in high pressure applications.

It will be understood that while the valve members 118 and 119 are preferably constructed in the form of hardened steel balls, the valve members may be suitably constructed in other forms as long as a portion of each valve member is provided with a substantially spherically shaped convex surface sized and shaped to conform and sealingly engage the concave surface of the respective valve seats 130 and 134.

DESCRIPTION OF THE EMBODIMENT OF FIGS. 11, 12 AND 13

Referring now to FIGS. 11, 12 and 13, a modified form of rotary gage valve is illustrated therein which is generally designated by the reference character 10b. The rotary gage valve 10b includes a slightly modified valve body 12b, a slightly modified operating handle 16b and a probe assembly 180. The valve stem 14 and valve member 18 are identical to the corresponding elements described above for the rotary gage valve 10 and those elements associated therewith retain the same reference character designations as set forth above.

The valve body 12b is modified in that a second transverse bore 182 is formed therein parallel to the transverse bore 26 and intersects the slightly modified flow passage 20b communicating with the passage segment 32 thereof. The flow passage 20b terminates at the intersection of the passage segment 32 and the second transverse bore 182.

A first resilient annular seal member 184, preferably an elastomeric or synthetic resin O-ring, is disposed within a first annular groove 186 formed in the wall of the second transverse bore 182 on one side of the intersection between the passage segment 32 and the transverse bore 182. A second resilient annular seal member 188, substantially identical to the seal member 184, is disposed in a second annular groove 190 formed in the wall of the transverse bore 182 on the opposite side of the intersection between the passage segment 32 and the transverse bore 182.

The probe assembly 180 includes a probe member 192 having a first end portion 194 and a second end portion 196. The probe assembly 180 further includes a fitting 198 which is threadedly secured to the second end portion 196 of the probe member 192 and includes a passage 200 formed therein extending from the second end portion 196 of the probe member 192 and including an internally threaded portion 202 which communicates with the upper end face 204 of the fitting 198. The internally threaded portion 202 provides means for threadedly securing a suitable gage or connecting conduit therein.

The probe member 192 includes a radially outwardly extending shoulder or flange 206 formed thereon intermediate the first and second end portions 194 and 196. The flange 206 is preferably provided with a hexagonal outer periphery to facilitate the engagement thereof by a conventional wrench.

The first end portion 194 of the probe member 192 includes a substantially cylindrical outer surface 208 having a diameter slightly less than the diameter of the second transverse bore 182 to provide a close fit therebetween. The probe member 192 is adapted to be slidably received within the second transverse bore 182 and, when fully inserted therein, the flange 206 abuts the exterior of the valve body 12b as shown in FIG. 12 and the annular seal members 184 and 188 sealingly engage the cylindrical outer surface 208 on opposite sides of the intersection of the passage segment 32 and the second transverse bore 182.

An intermediate peripheral surface 210 is formed on the first end portion 194 of the probe member 192 intermediate the areas of sealing engagement between the cylindrical outer surface 208 and the annular seal members 184 and 188 when the probe member 192 is fully inserted within the second transverse bore 182. An internal passage 212 is formed in the probe member 192 and communicates between the intermediate peripheral surface 210 and the second end face 214 of the second end portion 196. The internal passage 212 provides for fluid communication between the flow passage 20b and the second transverse bore 182 and the passage 200 in the fitting 198.

A circumferential groove 216 is formed on the first end portion 194 of the probe member 192 and is aligned with the operating handle 16b when the probe member 192 is fully inserted within the second transverse bore 182. A tapered circumferential surface 218 extends between the circumferential groove 216 and the cylindrical outer surface 208 to facilitate the passage of the probe member 192 by the annular seal members 184 and 188 during insertion of the probe member into the second transverse bore 182.

A first flat spot 217 is formed at a location spanning the intersection between the cylindrical outer surface 208 and the tapered circumferential surface 218. A similar second flat spot 219 is formed at a location spanning the intersection between the cylindrical outer surface 208 and the edge of the intermediate peripheral surface 210 nearest to the second end portion 196 of the probe member 192. Each of the flat spots 217 and 219 serves as a pressure release means whereby high pressure fluid entrapped in the cavity between intermediate peripheral surface 210 and the second transverse bore 182 may be bled off as the probe member 192 is withdrawn from the second transverse bore.

When the valve 10b is moved from an open to a closed position, high pressure fluid will be entrapped between the two resilient annular seal members 184 and 188. Then as the probe member 192 is withdrawn from the second transverse bore 182 the pressure is retained until one of the flat spots 217 and 129 moves past the point of contact of the probe member 192 with one of the resilient annular seal members 184 and 188, respectively. When such a point is reached the high pressure fluid is allowed to bleed between the annular seal member and the flat spot, thereby releasing the pressure. The purpose of this pressure release means is to prevent extrusion of the resilient annular seal members 184 and 188 between the second transverse bore 182 and the probe member 192. The pressure imbalance across either of the resilient annular seal members would tend to cause such extrusion when the seal member 184 or 188 contacted the tapered circumferential surface 218 or the intermediate peripheral surface 210, respectively.

The modified operating handle 16b is characterized by a radially outwardly extending cam lobe 220 and a radially inwardly extending recess 222 adjacent the cam lobe 220. When the valve 10b is in the closed position with the valve member 18 in sealing engagement with the valve seat 30, as shown in FIG. 12, the operating handle 16b is in the position shown in FIG. 11. The operating handle 16b includes a pair of inwardly directed tabs 224 and 226 which limit the amount of rotation of the operating handle 16b and valve stem 14 permitted relative to the valve body 12b through alternate engagement of the tabs with the valve body.

As shown in FIG. 11, the valve stem 14 and operating handle 16b are prevented from rotating in a clockwise direction through the engagement of the tab 224 with the valve body 12b. With the operating handle 16b in this position, the probe member 192 is permitted to be fully inserted through the second transverse bore 182 until the flange 206 engages the valve body 12b thus placing the circumferential groove 216 in registration with the cam lobe 220 of the operating handle 12b. With the probe member 192 fully inserted, the valve may then be opened by rotating the operating handle 16b and the valve stem 14 secured thereto in a counterclockwise direction indicated by the arrow 228. Rotation of the operating handle 16b in the direction indicated by the arrow 228 is limited by the engagement of the tab 226 with the exterior of the valve body 12b. When in this open position, the cam lobe 220 is rotated into the circumferential groove 216 of the probe member 192 thereby positively preventing the removal of the probe member from the second transverse bore 182 while the valve is in the open position.

When the probe assembly 180 is not being used and the probe member 192 is removed from the second transverse bore 182, it will be desirable to close the second transverse bore 182 to the possible entrance of foreign matter into the valve 10b. To achieve this closure of the second transverse bore 182, the valve 10b is provided with a blind plug 230 which may be suitably connected to the valve by means of a flexible chain or cable 232. The blind plug includes an outwardly extending flange 234, corresponding to the flange 206 of the probe member 192, and a cylindrical outer periphery 236, corresponding to the cylindrical outer periphery 208 of the probe member 192. Similarly, the plug 230 is provided with a circumferential groove 238 and a tapered circumferential surface 240 corresponding respectively to the circumferential groove 216 and the tapered circumferential surface 218 of the probe member 192. As with the probe member 192, when the plug 230 is fully inserted in the valve body 12b, the plug 230 will be positively retained in the valve body 12b when the operating handle 16b is rotated to the open position indicated by the arrow 228 through the engagement of the cam lobe 220 in the circumferential groove 238.

FIG. 13 illustrates an alternate form of probe member 192a which employs first and second resilient annular seal members 242 and 244 disposed respectively in first and second circumferential grooves 246 and 248 formed in the cylindrical outer surface 208 of the probe member 192a. A slightly modified intermediate peripheral surface 210a extends between the circumferential grooves 246 and 248 and communicates with the internal passage 212. The probe member 192a includes the previously described circumferential groove 216 of the probe member 192 to afford locking engagement with the cam lobe 220 when the operating handle 16b is turned to the open position.

As also shown in FIG. 13, the second transverse bore of the modified valve body 12c extends through the valve body and communicates with the passage segment 32. The second transverse bore is designated by the reference character 182a and is characterized by a tapered annular surface 250 formed at the intersection of the transverse bore and the exterior of the valve body to facilitate the insertion of the resilient annular seal members 242 and 244 within the transverse bore 182a. The transverse bore 182a is further characterized by the elimination of the annular grooves formed in the previously described second transverse bore 182 of the valve body 12b.

DESCRIPTION OF THE APPARATUS OF FIGS. 14 AND 15

Figure 14:
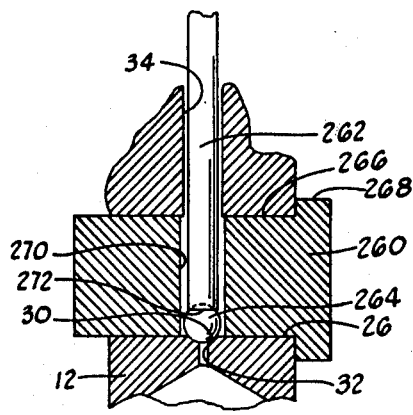
FIG. 14 is a cross-sectional view illustrating apparatus for forming a valve seat in the valve body of a valve constructed in accordance with the present invention.

FIG. 14 illustrates apparatus adapted for cold forming the spherically shaped concave annular valve seat 30 of the valve body 12. The apparatus includes a ball guide 260, a mandrel 262 and a hardened steel ball 264.

The ball guide is constructed of solid metal and includes a cylindrical outer periphery 266 having a diameter slightly less than the diameter of the transverse bore 26 of the valve body 12. A radially outwardly extending flange 268 is formed on one end of the ball guide 260 to provide precise longitudinal positioning of the ball guide within the transverse bore 26. A transverse passage 270 is formed in the ball guide 260 and extends through the longitudinal axis thereof. The diameter of the transverse passage 270 is slightly greater than the diameter of the hardened steel ball 264 so that the hardened steel ball may pass readily therethrough.

The mandrel 262 is preferably formed of rigid metallic bar stock such as drill rod and has a diameter slightly less than the diameter of the lower passage segment 34 of the valve body 12. The lower end face 272 of the mandrel 262 is preferably provided with a spherically shaped concave surface sized and shaped to conform to and snugly receive the exterior of the hardened steel ball 264 therein.

To cold form the valve seat 30 in the valve body 12, the valve body 12 is inverted with the seat area facing upwardly and is secured in a suitable fixture. The hardened steel ball 264 is positioned within the passage 270 of the ball guide 260 and the ball guide is inserted in the transverse bore 26 with the transverse passage 270 aligned with the longitudinal axis of the lower passage segment 34. When the transverse passage 270 is properly aligned with the lower passage segment 34, the hardened steel ball 264 is positioned in the valve seat area by gravity.

The mandrel 262 is then introduced downwardly through the lower passage segment 34 and the lower end face 272 thereof engages the hardened steel ball 264. A predetermined amount of downward force is then applied to the area of the valve seat 30 through the hardened steel ball 264 and the mandrel 262 by suitable means such as a hydraulic press acting on the mandrel. It will be understood that the diameter of the hardened steel ball 264 is identical to the diameter of the spherically shaped convex surface of the valve member 18 which will be employed in the valve 10. In the event the valve member 18 is to be a hardened steel ball, the valve member 18 and the hardened steel ball 264 will preferably be identical.

Figure 15:
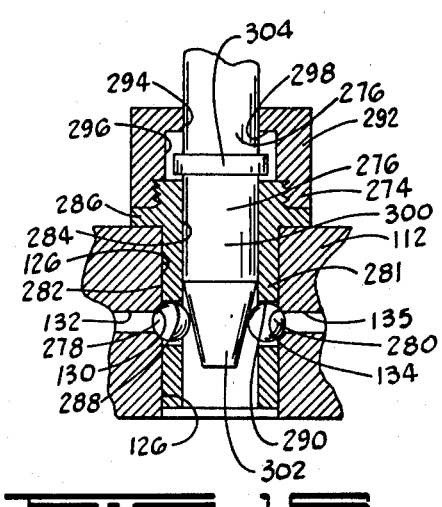
FIG. 15 is a cross-sectional view illustrating apparatus for simultaneously forming a pair of valve seats in the valve body of a valve constructed in accordance with the present invention.

FIG. 15 illustrates another form of apparatus suitable for employment in cold forming the spherically shaped concave annular valve seats 130 and 134 in the valve body 112 of the bi-directional valve 110. The apparatus includes a ball guide 274, a mandrel 276 and a pair of hardened steel balls 278 and 280.

The ball guide 274 includes a lower member 281 having a cylindrically shaped outer periphery 282 formed thereon having a diameter slightly less than the diameter of the transverse bore 126 of the valve body 112. A longitudinal bore 284 extends through the lower member 281 coaxial with the outer periphery 282. A radially outwardly extending flange 286 is formed on the lower member 281 to provide positive longitudinal location of the lower member 281 within the transverse bore 126. A pair of aligned apertures 288 and 290 are formed in the lower member 281 with the coaxial center lines thereof intersecting the longitudinal axis of the lower member 281 at a right angle.

The ball guide 274 further includes an upper member 292 threadedly secured to the lower member 281 and having a longitudinal bore 294 formed therein having a diameter equal to the longitudinal bore 284 of the lower member 281 and coaxially aligned therewith. An annular recess 296 is formed within the upper member 292 and includes an annular shoulder 298 which communicates with the longitudinal bore 294. The mandrel 276 has a cylindrical outer periphery 300 having a diameter slightly less than the diameters of the longitudinal bores 284 and 294 of the ball guide 274. A tapered circumferential surface 302 is formed on the lower end portion of the mandrel 276 and engages the hardened steel balls 278 and 280 disposed respectively in the apertures 288 and 290. A radially outwardly extending flange 304 is formed on the outer periphery 300 of the mandrel 276 and is received within the annular recess 296 and provides limited longitudinal movement of the mandrel 276 relative to the ball guide 274.

The valve seats 130 and 134 are cold formed in the valve body 112 by securing the body 112 in a suitable fixture and inserting the ball guide 274, mandrel 276 and steel balls 278 and 280 in the transverse bore 126 until the flange 286 engages the exterior of the valve body 112. At this point the apertures 288 and 290 of the ball guide 274 are in longitudinal registration with the passage segments 132 and 135. The ball guide 274 is then rotated relative to the valve body 112 until the apertures 288 and 290 are in coaxial alignment with the passage segments 132 and 135. The mandrel 276 is then forced downwardly relative to the ball guide 274 and valve body 112 by suitable means such as a hydraulic press thereby forcing the steel balls 278 and 280 radially outwardly relative to the ball guide 274 to cold form the respective spherically shaped concave valve seats 130 and 134 in the valve body 112. When the valve seats are suitably cold formed, the mandrel 276 is raised upwardly until the flange 304 engages the annular shoulder 198 which in turn causes the withdrawal of the ball guide 274, and the steel balls 278 and 280 from the valve body 112 in response to further upward movement of the mandrel 276.

DESCRIPTION OF THE EMBODIMENT OF FIGS. 16 AND 17

Figure 16:
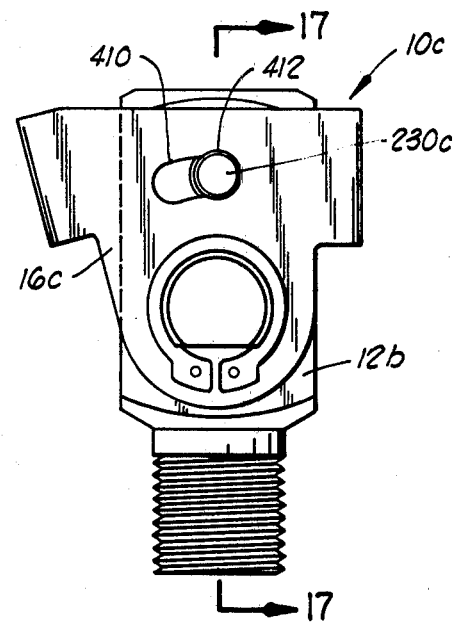
FIG. 16 is an elevational view of a slightly modified embodiment of the valve in FIG. 11, showing the plug in place, the pressure probe having been removed.
Figure 17:
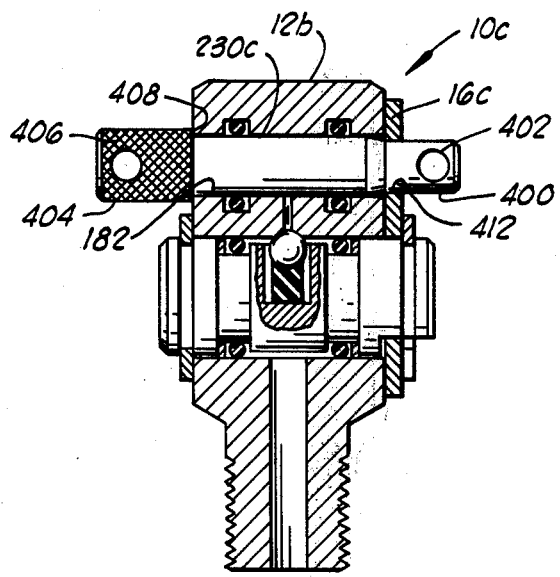
FIG. 17 is a cross-sectional view taken along line 17—17 of FIG. 16.

Referring now to FIGS. 16 and 17, a modified form of rotary gauge valve is illustrated therein which is generally designated by the reference character 10c. The valve 10c is similar to the valve 10b, the differences being that the probe assembly 180 has been removed and a modified blind plug 230c is shown in place within the second transverse bore 182, and that a modified operating handle 16c is used.

The plug 230c includes a first end portion 400 which extends from the second transverse bore 182 when the plug is fully inserted therein as is seen in FIG. 17. The first end portion 400 includes a transverse cavity 402 therethrough. By means of the cavity 402 the plug 230c may be retained within the bore 182 by placing therein a retainer (not shown), such as the hasp of a conventional lock. The plug 230c includes a second end portion 404 which includes a knurled outer surface 406 and a shoulder 408 which abuts the valve body 12b when the plug 230c is fully inserted.

The modified operating handle 16c is similar to the operating handle 16 used on the valve 10 as seen in FIG. 1, except that the handle 16c includes a slot 410 having an enlarged hole 412 at one end thereof. The dimensions of the hole 412 are such that it closely receives the first end portion 400 of the plug 230c. The dimensions of the slot 410 are such that the lateral dimension thereof is smaller than the diameter, or smallest cross-sectional dimension, of the first end portion 400. In this manner, when the operating handle 16c is in a closed position as seen in FIG. 16, the plug 230c may be fully inserted in the second transverse bore 182 so that the first end portion 400 of the plug extends from the bore through the hole 412 as seen in FIG. 17. This then locks the operating handle 16c in a place so that it may not be moved from the closed position without first removing the blind plug 230c. By inserting the hasp of a conventional lock through the cavity 402, and locking the same, the valve 10c may be secured in a closed position in a foolproof manner.

Furthermore, the lateral dimension of the slot 410 is such that it is larger than the diameter of the probe member 192 of FIG. 12 at the groove 216, so that when the plug 230c is removed, and the probe member 192 inserted, the operating handle 16c may be freely rotated to open and close the valve 10c. The lateral dimension of the slot 410 is also such that it is less than the diameter of the probe member 192 adjacent the groove 216 so that when the operating handle 16c is rotated to an open position, the probe member 192 is securely retained within the second transverse bore 182.

From the foregoing detailed description, it will be seen that the present invention provides valve structure which is well adapted for high pressure applications. The valve structure is especially advantageous when employed between a source of high pressure fluid and a pressure gauge under circumstances where it is desirable to constantly apply the high pressure fluid to the gauge mechanism.

The valve structure of the present invention may further be advantageously employed in environments where high pressure corrosive fluids are to be handled by the valve due to the fact that the valve stem configuration of the various embodiments of the present invention eliminates the inherently weak, conventional bonnet structure employed in prior art valves and provides, in lieu thereof, a pressure balanced valve stem. The pressure balanced valve stem structure of the present invention eliminates the possibility of the valve stem being blown out of the valve body due to corrosion failure which is a distinct disadvantage of the bonnet-type prior art valves.

The sealing action of the spherically shaped valve members and the corresponding spherically shaped concave valve seats of the various forms of the valves disclosed herein provide marked advantages over the prior art needle valve structures employed between sources of high pressure fluids and pressure gauges. The pressure differential across the valves of the present invention when in the closed position further enhances the sealing engagement between the respective valve members and valve seats where, in contrast, the same pressure differential across a closed needle valve acts against sealing engagement between the needle valve member and the conical valve seat of the needle valve structure. Thus, repeated cycling of the valves of the present invention between open and closed positions does not tend to render these valves inoperative since each time such a valve is placed in the closed position, the pressure differential across the valve member and valve seat forces the valve member into the valve seat thereby tending to reform the relatively softer valve seat to achieve continued sealing engagement between the valve member and the valve seat. In contrast, the prior art needle valves are often rendered inoperative after they are opened one time in a high pressure environment.

Changes may be made in the combination and arrangement of parts or elements as heretofore set forth in the specification and shown in the drawings without departing from the spirit and scope of the invention as defined in the following claims.

What is claimed is:

1. A valve comprising:
 a valve body;
 a flow passage formed in said valve body;
 a cylindrical bore extending entirely through said valve body and transversely intersecting said flow passage;
 cylindrical valve stem means journaled in said cylindrical bore and having a transverse cavity formed therein aligned normal to the axis of rotation of said valve stem means, and further having a reduced diameter portion disposed centrally on said stem means adjacent said cavity for communicating portions of said flow passage located on opposite sides of said bore with each other when said valve is open;
 seal means mutually engaging said valve stem means and said bore for providing fluid-tight communication between said cylindrical bore and said flow passage at the intersection therebetween;
 valve seat means disposed in said valve body along at least one line of intersection between said flow passage and said bore;
 spherical valve member means in the form of a sphere having an uninterrupted spherical external surface and slidably and rotatably partially received in the cavity in said valve stem means and adapted for rotative motion about an infinite number of axes of rotation relative to said valve stem means for engaging said valve seat means with a portion of its spherical external surface to close said flow passage and, alternately, disengaging from said valve seat means to open said flow passage;

biasing means in said cavity and operatively engaging said valve member means for urging said valve member means radially outwardly relative to said valve stem means;

operator means engaged with said valve stem means for moving said valve stem means and said valve member means relative to said valve seat means and said valve body into a position closing said flow passage and, alternately, into a position opening said flow passage;

a second bore extending through said valve body and transversely intersecting said flow passage, said valve seat means being positioned intermediate said second bore and said valve stem means;

probe means having a first end portion and a second end portion and having a substantially cylindrically shaped outer surface on the first end portion thereof slidingly received within said second bore;

a first annular probe seal for mutually sealingly engaging said probe means and said second bore on one side of the intersection of said second bore and said flow passage;

a second annular probe seal for mutually sealingly engaging said probe means and said second bore on the opposite side of the intersection of said second bore and said flow passage; and a passage formed in said probe means communicating between the outer surface of said probe means intermediate said first and second annular probe seals and the second end portion of said probe means.

2. The valve as defined in claim 1 wherein:
said probe means is characterized further to include:
a first annular groove in the cylindrically shaped surface of the first end portion of said probe means adjacent said second bore on one side of the intersection of said passage in said probe means and the outer surface of said probe means, and receiving said first probe seal; and
a second annular groove formed in the cylindrically shaped surface on the first end portion of said probe means adjacent said second bore on the opposite side of the intersection of said passage in said probe means and the outer surface of said probe means, and receiving said second probe seal.

3. The valve as defined in claim 1 wherein:
said second bore is characterized further to include:
a first annular groove formed in said second bore on one side of the intersection of said second bore and said flow passage, and receiving said first probe seal; and
a second annular groove formed in said second bore on the opposite side of the intersection of said second bore and said flow passage, and receiving said second probe seal.

4. The valve as defined in claim 1 characterized further to include:
means carried by said valve body and selectively engageable with the first end portion of said probe means for securing the first end portion of said probe means within said second bore with said passage in said probe means in communication with said flow passage in said second bore when said valve member means is disengaged from said valve seat to open said flow passage.

5. The valve as defined in claim 1 characterized further to include:
means operatively engageable with said valve body and said probe means for positioning said probe means within said second bore to place said passage in said probe means in communication with said flow passage.

6. The valve as defined in claim 1 characterized further to include:
means on the second end portion of said probe means for securing said probe means to an external fitting with the interior of said fitting communicating with the passage in said probe means.

7. The valve as defined in claim 1 characterized further to include:
plug means having a first end portion and a second end portion and having a substantially cylindrically shaped outer surface on said first end portion slidingly received within said second bore for closing said second bore when said probe means is removed therefrom.

8. The valve as defined in claim 7 wherein said plug means has the first end portion thereof extending from the second bore when the plug is fully inserted therein, and said valve is further characterized as including means on the part of said first end portion of said plug means which extends from said second bore facilitating retention of the plug means in said second bore.

9. The valve as defined in claim 8 wherein said operator means is further characterized as including a slot enlarged at one location therealong and receiving in said enlargement the extended part of the first end portion of said plug means when said operator means is in a valve closing position.

10. A valve comprising:
a valve body;
a flow passage formed in said valve body;
a first bore extending entirely through said valve body and transversely intersecting said flow passage;
valve stem means journaled in said first bore and having a transverse cavity formed therein aligned normal to the axis of rotation of said valve stem means, and further having an annular reduced diameter portion disposed centrally on said stem means adjacent said cavity for communicating portions of said flow passage located on opposite sides of said bore with each other when said valve is open;
seal means mutually engaging said valve stem means and said first bore for providing fluid-tight communication between said first bore and said flow passage at the intersection therebetween;
valve member means disposed between said transverse cavity and said flow passage when said valve is closed;
a second bore extending through said valve body and transversely intersecting said flow passage, said valve member means being positioned intermediate said second bore and said valve stem means when said valve is closed;
probe means having:
a first end portion and a second end portion and having a substantially cylindrically shaped outer surface on the first end portion thereof slidingly received within said second bore;
an intermediate peripheral surface located between said first and second end portions adjacent said flow passage, said intermediate peripheral surface being an annular reduced diameter surface; and a passage formed in said probe means communicating between the intermediate peripheral surface and the second end portion of said probe means; and operator means engaged with said valve stem means for moving said valve stem means relative to said valve body into a position closing said flow passage and, alternately, into a position opening said flow passage.

11. A valve as defined in claim 10, further comprising a pressure relief surface formed at a location spanning an intersection between said cylindrical outer surface of said first end portion of said probe and said intermediate peripheral surface.

* * * * *